(12) United States Patent
Harnetiaux et al.

(10) Patent No.: US 7,678,000 B2
(45) Date of Patent: Mar. 16, 2010

(54) TENSIONING ARRANGEMENT FOR AN ENDLESS LINKAGE

(75) Inventors: Travis L. Harnetiaux, Woodridge, IL (US); Chad M. Johnson, Arlington Heights, IL (US)

(73) Assignee: CNH America, LLC., New Holland, PA (US)

( * ) Notice: Subject to any disclaimer, the term of this patent is extended or adjusted under 35 U.S.C. 154(b) by 863 days.

(21) Appl. No.: 11/424,687

(22) Filed: Jun. 16, 2006

(65) Prior Publication Data

US 2007/0293360 A1 Dec. 20, 2007

(51) Int. Cl.
*F16H 7/08* (2006.01)
*F16H 7/12* (2006.01)

(52) U.S. Cl. .................. 474/117; 474/133; 474/134

(58) Field of Classification Search .............. 474/117, 474/123, 133–138, 144, 151; 56/14.9, 15.6, 56/15.9, 17.3; 111/52, 59, 184
See application file for complete search history.

(56) References Cited

U.S. PATENT DOCUMENTS

| 2,391,975 | A |   | 1/1946  | Hyland |
|-----------|---|---|---------|--------|
| 2,831,444 | A |   | 4/1958  | Schill |
| 2,953,930 | A | * | 9/1960  | Meyer .................. 474/148 |
| 3,200,778 | A |   | 8/1965  | Whelchel |
| 3,251,235 | A | * | 5/1966  | Cederberg et al. ......... 474/123 |
| 3,391,807 | A |   | 7/1968  | Buschbom |
| 3,448,629 | A | * | 6/1969  | Norcross et al. .......... 474/148 |
| 3,485,108 | A | * | 12/1969 | Kientz et al. ............ 474/134 |
| 3,613,462 | A | * | 10/1971 | Stibbe .................... 74/15.63 |
| 3,817,113 | A |   | 6/1974  | Pfarrwaller |
| 3,817,114 | A |   | 6/1974  | Klee |
| 3,958,837 | A | * | 5/1976  | Chagawa ................. 474/185 |
| 4,083,247 | A | * | 4/1978  | Umezaki et al. .......... 474/151 |
| 4,240,303 | A | * | 12/1980 | Mosley .................. 474/144 |
| 4,425,857 | A |   | 1/1984  | Lienemann et al. |
| 4,521,208 | A |   | 6/1985  | Doveri |
| 4,550,860 | A |   | 11/1985 | Weeder |
| 4,742,785 | A |   | 5/1988  | Kolk et al. |
| 4,981,116 | A | * | 1/1991  | Trinquard ............... 474/134 |
| 5,246,403 | A | * | 9/1993  | Uphaus .................. 474/117 |
| 5,776,025 | A | * | 7/1998  | Labudde et al. .......... 474/135 |
| 6,003,454 | A |   | 12/1999 | Ozers et al. |

(Continued)

OTHER PUBLICATIONS

Kinze Manufacturing, Inc., Product Manual for 3600 Series Planter, Aug. 5, 2005, p. 7-8.

*Primary Examiner*—Marcus Charles
(74) *Attorney, Agent, or Firm*—Rebecca L. Henkel; John William Stader

(57) ABSTRACT

A tensioning arrangement to an endless linkage of a drive train is provided. The tensioning arrangement includes a tension arm and a spool mounted at the tension arm. The spool includes a rib generally centrally located between opposing first and second endwalls of the spool. The rib includes a greater outer diameter relative to an outer diameter of adjacent cylindrical portions abutting the rib. Both opposing first and second endwalls of the spool are of greater outer diameter so as to steer the endless linkage therebetween in general alignment with the rib. A spring includes a hook free end engaged at the tension arm, and a linear shaped free end engaged at the frame so as to bias the spool against the endless linkage.

17 Claims, 3 Drawing Sheets

U.S. PATENT DOCUMENTS

| | | | |
|---|---|---|---|
| 6,004,237 A | 12/1999 | Lodico et al. | |
| 6,167,686 B1 | 1/2001 | Becker et al. | |
| 6,406,392 B1 | 6/2002 | Luh | |
| 6,520,100 B1 | 2/2003 | Spooner, Sr. et al. | |
| 7,115,056 B2 * | 10/2006 | Rapkin et al. | 474/133 |
| 2003/0224889 A1 | 12/2003 | Luh | |

* cited by examiner

TENSIONING ARRANGEMENT FOR AN ENDLESS LINKAGE

RELATED APPLICATIONS

Not applicable.

BACKGROUND OF THE INVENTION

1. Field of the Invention

The invention relates to agricultural planters, and more particularly, relates to an arrangement to provide tension in a endless chain of a chain drive associated with driving a metering assembly so as to regulate a distribution of particulate product from the planter to the field.

2. Discussion of the Related Art

Conventional planters typically include a series of evenly spaced row planter units connected to a tool bar so as to be towed across a field. The row planter units are generally configured to plant particulate product (i.e., seed, herbicide, pesticide, fertilizer, etc.) in evenly spaced individual rows. The planter is usually towed by a propelling vehicle such as a tractor or other prime mover across the field.

A typical row planter unit includes a furrow opening mechanism followed by a furrow closing mechanism, a hopper in communication with a chute, and a drive mechanism operatively connected to a metering mechanism at the row planter unit so as to selectively control a distribution rate (e.g., planting rate, etc.) of the particulate product across the field. The drive train generally includes a sprocket operatively coupled to the meter mechanism, a sprocket operatively coupled to a hydraulic or mechanical drive configured to be selectively controlled by the operator, and an endless chain or belt interconnecting around the sprockets in a conventional manner such that the drive operatively controls the distribution rate of the metering mechanism. The planter row unit further includes certain tensioning mechanism developed to apply or increase tension so as to remove slack in the endless chain or belt, thereby enhancing engagement of the sprockets with the endless chain or belt.

However, these certain known tensioning mechanisms have drawbacks. For example, operators using certain known tensioning mechanisms have indicated occurrences of binding events that inhibit performance of the metering mechanism of the associated row planting unit. Also, the endless chain is known to track off to one side or the other of known tensioning mechanisms, increasing the likelihood of the binding events described above.

Therefore, there is a desire for a tensioning mechanism that reduces a likelihood of binding events during operation of the row planter unit. The tensioning arrangement should also be versatile so as extend its lifetime and minimize replacement. Also, the tensioning arrangement should be simple in design so as to reduce costs associated with labor and manufacturing.

SUMMARY OF THE INVENTION

The present invention provides an arrangement for and a method of tensioning a endless linkage associated with driving a row planting unit that addresses the drawbacks described above. The tensioning arrangement of the invention enhances tracking of the endless linkage therethrough, thereby reducing opportunities for binding events during operation of the row planter unit. The tensioning arrangement of the invention is also simple in design and parts for ready manufacturability.

In a first embodiment of the present invention, a tensioning arrangement used with an endless linkage of a drive train is provided. The tensioning arrangement includes a tension arm and a guide spool mounted at the tension arm. The guide spool includes a rib generally centrally located between opposing first and second endwalls of the guide spool. The rib includes a greater outer diameter relative to an outer diameter of adjacent cylindrical portions abutting the rib. Both opposing first and second endwalls of the guide spool are of greater outer diameter relative to the rib so as to steer the endless linkage between the first and second endwalls in general alignment with the rib. A spring includes a hook free end engaged at the tension arm, and a linear shaped free end engaged at the frame so as to bias the guide spool against the endless linkage.

In the preferred embodiment of the arrangement, the at least one guide spool includes a first spool and a second spool mounted at opposite ends of the least one tension arm, both the first and second spools configured to engage the linkage passing therebetween. The at least one tension arm includes a first tension arm spaced apart from a second tension arm so as to mount the first and second spools therebetween. One embodiment of the arrangement includes the first and second spools integral with the first and second tension arms as one-piece construction. Alternatively, the spools can be manufactured and assembled as separate components with the tension arms. The first spool is generally identical to the second spool and the first tension arm is generally identical to the second arm such that one side of the first and second spools of the arrangement engages the endless linkage, and is configured to be detached and flipped such that an opposite side of the first and second spools of the arrangement engages the endless linkage. The preferred rib at each spool is of generally continuous outer diameter and uniform width along its entire circumference.

The preferred embodiment of the tensioning arrangement further includes a spring configured to bias the at least one spool in engagement against the endless linkage relative to the frame. The spring includes a hook free end spaced apart from a linear-shaped free end. The hook end engages at the at least one tension arm, and the linear shaped free end engages at a frame in support of the drive train.

The preferred embodiment of the arrangement further includes a spindle configured to insert through a first opening in the at least one tension arm in rotational support of the at least one spool and tension arm. The spindle includes a first stepped portion having a greater outer diameter relative to an outer diameter of a second stepped portion. The first stepped portion inserts through the spring, and the second stepped portion inserts through the opening of the at least one tension arm and the opening in the at least one spool. The spindle includes an opening through both the first and second stepped portions so as to receive a threaded fastener therethrough in rotational support of the spindle from the frame of the row planter unit.

In another embodiment, the present invention provides a row planting unit configured to distribute a particulate product across a field. The row planter unit comprises a drive train having an endless linkage configured to move a metering assembly operable to regulate the distribution of particulate product from the planting unit, and a wheeled frame in support of the drive train and the endless linkage. The planter unit further includes a tensioning arrangement mounted at the endless linkage of the drive train. The arrangement includes at least one guide spool mounted at an at least one tension arm, and a spring having a hook free end spaced apart from a linear-shaped free end. The hook free end engages at the at least one tension arm. The linear shaped free end engages at the row unit frame in biasing the guide spool in engagement against the endless linkage.

In yet another embodiment, the present invention provides an agricultural planting implement in tow to distribute particulate product across a field, the implement including a toolbar coupled to at least one planter row unit operable to distribute the particulate product across the field, and at least row planter unit coupled at the tool bar. The row planter unit includes a drive train having an endless linkage configured to move a metering assembly operable to regulate the distribution of particulate product from the planter unit, a wheeled frame in support of the drive train and the endless linkage; and a tensioning arrangement mounted at the endless linkage of the drive train. The tensioning arrangement includes at least one guide spool mounted at an at least one tension arm, and a spring having a hook free end spaced apart from a linear-shaped free end. The hook free end engages at the at least one tension arm, and the linear shaped free end engages at the row unit frame in biasing the guide spool in engagement against the endless linkage.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
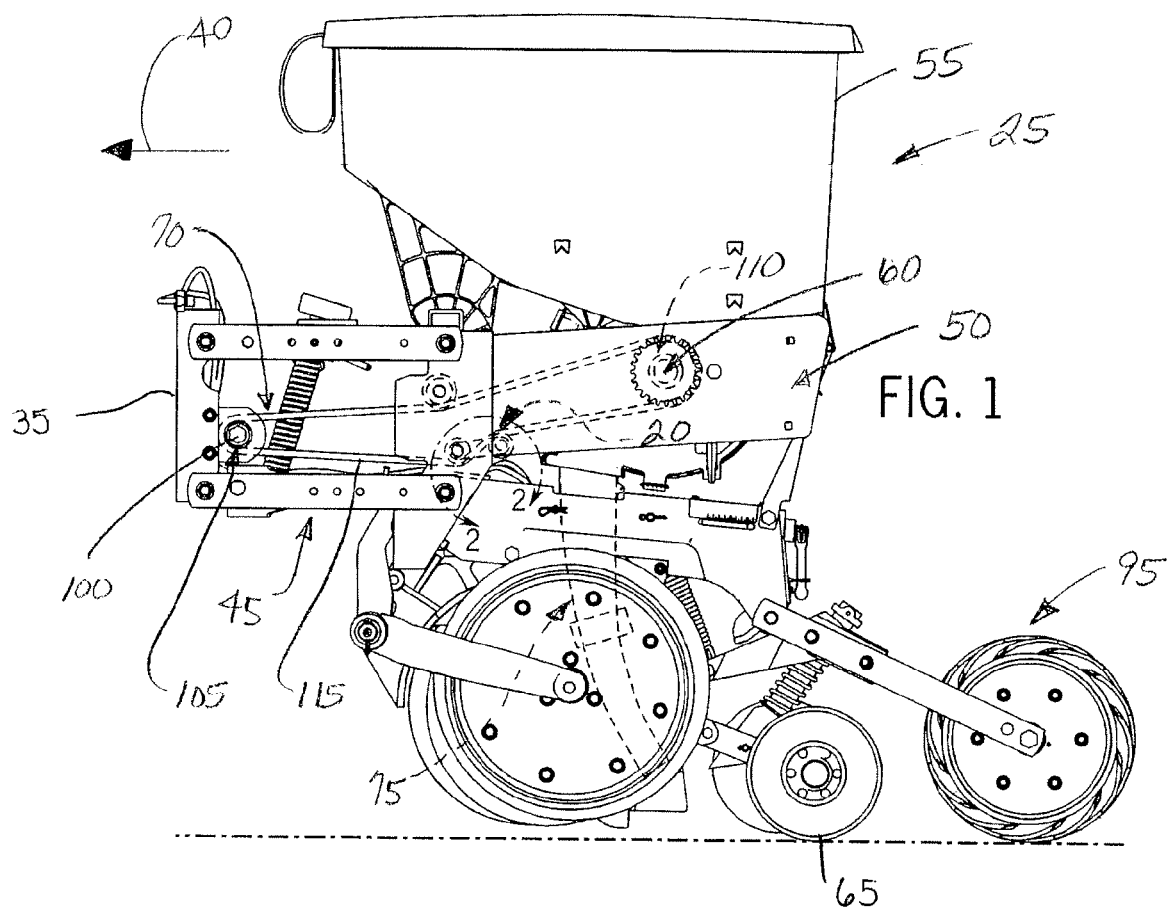
FIG. 1 illustrates a side elevation of a row planter unit employing a tensioning arrangement in accordance with the present invention.
Figure 2:
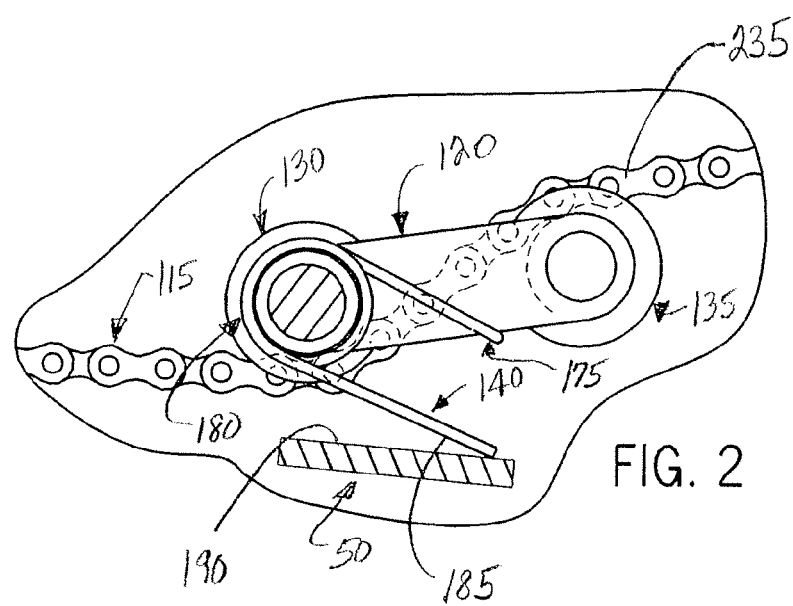
FIG. 2 illustrates a detailed side elevation view along line 2-2 in FIG. 1.
Figure 3:
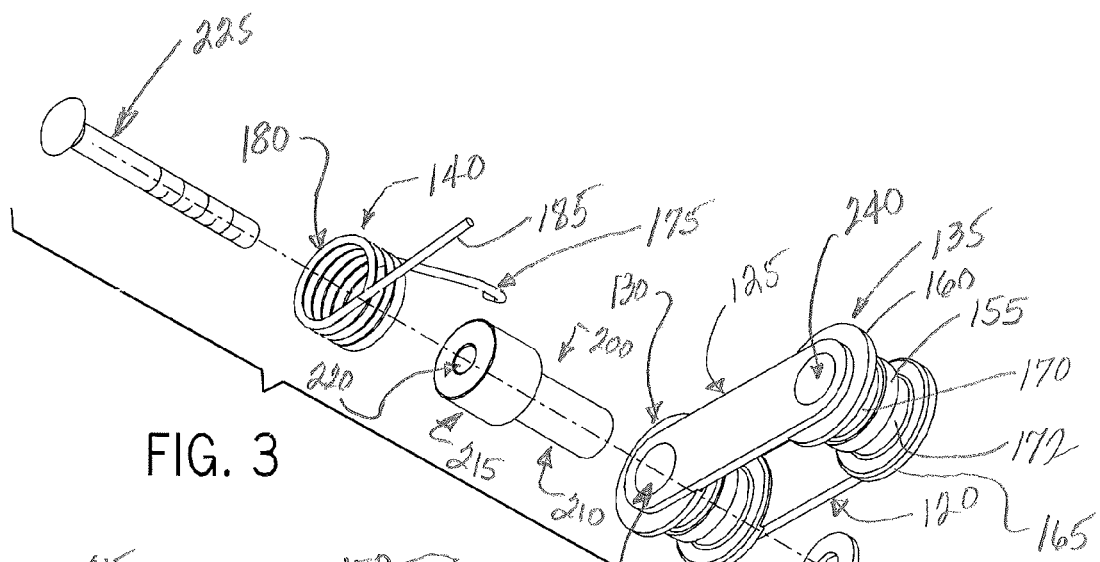
FIG. 3 illustrates an exploded isometric view of the tensioning arrangement of the present invention.
Figure 6:
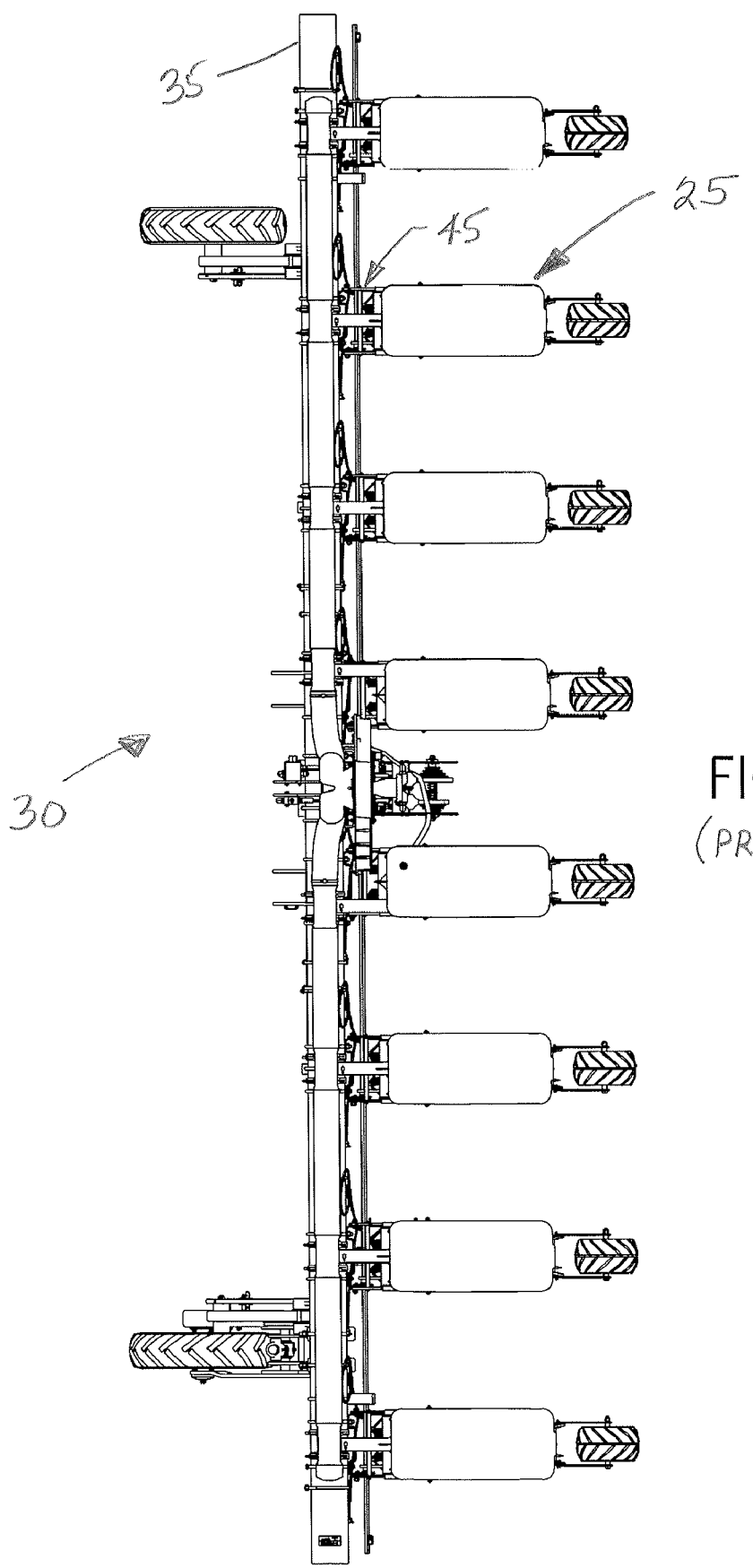
FIG. 6 shows a known agricultural implement that includes toolbar in towed support of a series of row planter units.

Referring to FIG. 1, an exemplary embodiment of a tensioning arrangement 20 in accordance with the present invention in use on a row planter unit 25 mounted on an agricultural implement 30 (See FIG. 6) equipped to be drawn by a prime mover (not shown) across an agricultural field in a conventional manner. As shown in FIG. 6, the exemplary agricultural implement 30 includes a transversely extending tool bar 35 relative to a direction of travel 40 in support of a series of individual row planter units 25 each configured to regulate the distribution of agricultural product (e.g., seed, fertilizer, pesticide, herbicide, etc.) across the field.

Still referring to FIG. 6, each row planter unit 25 is connected to the tool bar 35 by a parallel bar linkage 45 such that each row unit 25 generally follows the ground contour independently of the other units 25. As illustrated in FIG. 1, each row unit 25 generally includes a frame 50, a hopper 55, a metering mechanism 60, a furrow opening and closing mechanism 65, and a drive train 70. The frame 50 generally comprises a structure configured to support the hopper 55, the metering mechanism 60, the furrow opening and closing mechanism 65, and the drive train 70 from the ground. It should be understood that the frame 50 may have a variety of different sizes, shapes and configurations depending upon the type of prime mover (not shown) pulling the agricultural implement 25 as well as the size, configuration and number of hoppers 55 and drive trains 70.

The hopper 55 is supported on the frame 50 and provides for storage and dispensing of the product to the metering mechanism 60. The metering mechanism 60 is conventionally known and is attached substantially below the hopper 55 and at the hopper 55. Driven by rotation of the drive train 70, the metering mechanism 60 regulates and dispenses product through a chute 75 to a furrow formed in the ground by the furrow opening and closing mechanism 65 in a conventional manner.

The furrow opening and closing mechanism 65 is mounted to the underside of the frame 50 and generally includes a pair of laterally spaced furrow opening discs 80, an opener chute 85, a pair of laterally spaced furrow closer discs 90 and press wheel 95. In a conventional manner, the furrow opener discs 80 and opener chute 85 generally create the furrow in the soil. Once the product is deposited at a controlled rate by the metering mechanism 60 via the chute 75 into the furrow, the seed closer discs 90 closes the furrow together and over the product. The press wheel 95 operatively compacts the soil closed over the product. It should be understood that the row planter unit 25 alternatively can include other mechanisms for implanting product into the ground, such as runner type openers for creating a furrow in the ground.

Referring back to FIG. 1, the drive train 70 is interconnected in a conventional manner to control the distribution rate of the metering mechanism 60. The exemplary drive train 70 generally includes a drive shaft 100, sprockets 105 and 110, and an endless linkage 115 wrapped around the sprockets 105 and 110. The exemplary drive shaft 100 comprises an elongate bar rotatably driven in a selectively controlled manner by the operator so as to drive the sprocket 105. The driving sprocket 105 is operatively coupled via the endless linkage 115 to the driven sprocket 110. The driven sprocket 110 is rotatably mounted at the frame 50 and operatively coupled so as to drive rotation of the metering mechanism 60. The exemplary endless linkage 115 is a conventional chain comprising a series of pivotally interconnected linkages. However, it should also be understood that the type of endless linkage 115 (e.g., chain, belt, etc.) can vary.

As shown in FIG. 1, the tensioning arrangement 20 of the invention is configured to operatively maintain tension and alignment of the endless linkage 115 in use with the drive train 70 in moving the metering mechanism 60. Referring now to FIGS. 2-5, the exemplary tensioning arrangement 20 includes a pair of tension arms 120 and 125 and a pair of guide spools 130 and 135 mounted in spaced relation therebetween, and a spring 140 configured to bias the spools against the endless linkage 115 passing therebetween.

Figure 4:
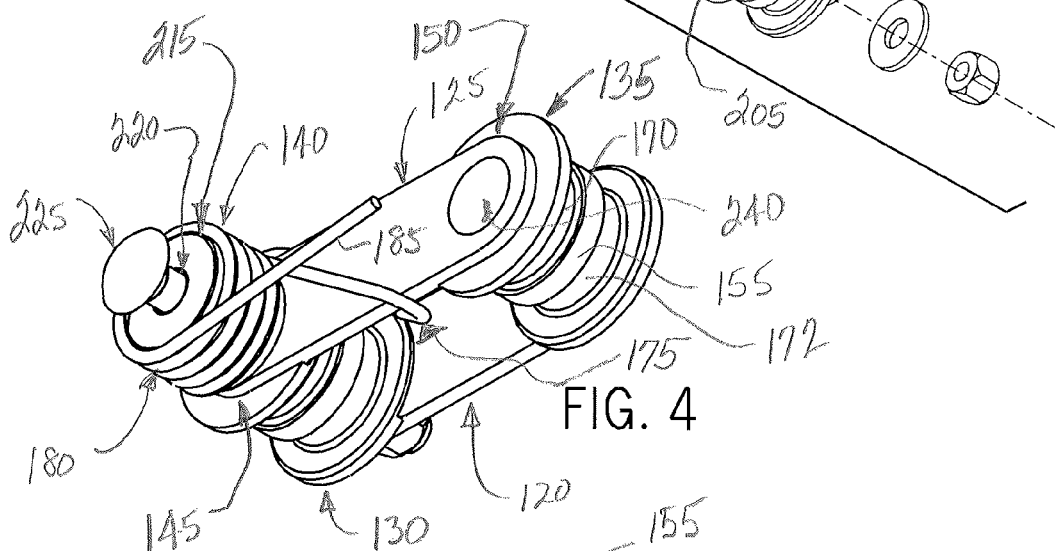
FIG. 4 shows an isometric view of the tensioning arrangement shown in FIG. 3.
Figure 5:
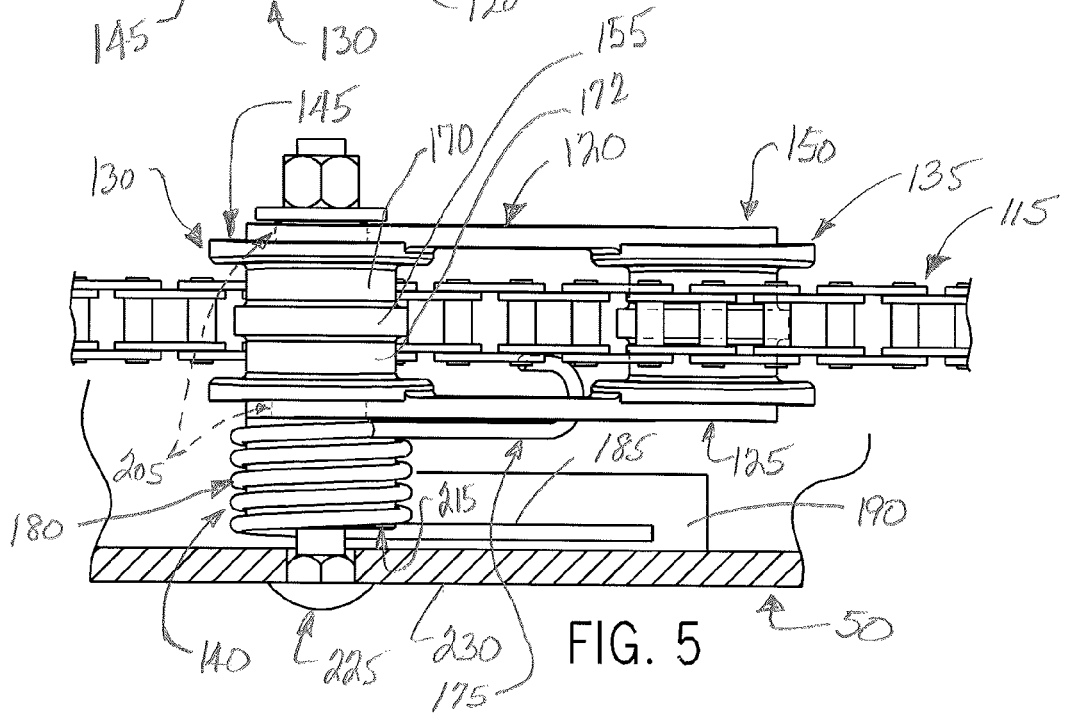
FIG. 5 illustrates a top plan view of the tensioning arrangement shown in FIG. 1.

Referring specifically to FIGS. 4-5, the exemplary tension arms 120 and 125 are generally identical and spaced a distance apart to rotatably receive the spools 130 and 135 therebetween. Each tension arm 120 and 125 is of thin-wall construction, and generally includes opposed first and second ends 145 and 150 respectively. The first spool 130 is mounted between the first ends 145 of the first and second tension arms 120 and 125, and the second spool 135 is mounted between the opposite second ends 150 of the first and second tension arms 120 and 125. In one embodiment, one or both of the spools 130 and 135 is constructed as one-piece integrally with, and thereby fixedly connected and stationary with respect to, one or both of the tension arms 120 and 125. In another embodiment, one or both of the spools 130 and 135 is rotatably mounted with respect to the tension arms 120 and 125.

Both the first and second spools 130 and 135 are configured to engage the endless linkage 115 passing therebetween. Each exemplary spool 130 and 135 generally includes a rib 155 generally centrally located between opposing first and second endwalls 160 and 165. The preferred rib 155 at each spool 130 and 135 is of generally a continuous and constant outer diameter and of uniform width along its entire circumference. The rib 155 includes an outer diameter which is greater relative to an outer diameter of adjacent circumferential portions 170 and 172 abutting the rib 155. Both opposing first and second endwalls 160 and 165 are of greater outer diameter relative to the rib 155 so as to steer the endless linkage 115 between the first and second endwalls 160 and 165 in general alignment with the rib 155.

The first tension arm 120 is interchangeable with the second tension arm 125. Likewise, the first spool 130 is interchangeable with the second spool 135. Accordingly, the first and second spools 130 and 135 of the arrangement 20 are configured to be detached and flipped so as to balance wear and tear on the spools 130 and 135.

The spring 140 generally biases the spools 130 and 135 in engagement against the endless linkage 115 relative to the frame 50 of the unit 25. The exemplary spring 140 is a torsion spring that includes a hooked free end 175 spaced apart by a coil shaped body 180 from a linear-shaped free end 185. The hooked end 175 of the spring 140 engages at one of tension arms 120 and 125. The linear shaped free end 185 of the spring 140 engages at a horizontal portion 190 of the frame 50 of the row planter unit 25.

The exemplary tensioning arrangement 20 further includes a spindle 200 configured to insert through openings 205 in each of the tension arms 120 and 125 in rotational support of the spool 130. The spindle 200 includes a first stepped portion 210 having a greater outer diameter relative to an outer diameter of an abutting second stepped portion 215. The first stepped portion 210 inserts through the coiled body 180 of the spring 140, and the second stepped portion 215 inserts through the openings 205 of the tension arms 120 and 125 and through the spool 130. The spindle 200 includes an opening 220 extending through both the first and second stepped portions 210 and 215 so as to receive a fastener 225 (e.g., threaded bolt) therethrough in rotatable support of the spindle 200 from a vertical portion 230 of the frame 50 of the row planter unit 25. The rotatable connection of the fastener 225 at the frame 50 in combination with the bias of the spring 140 against the frame 50 causes the arrangement 20 to maintain tension in the endless linkage 115 in wrapped engagement around the sprockets 105 and 110 of the drive train 70.

Having described the general construction of the tensioning arrangement 20 of the present invention in combination with the drive train 70 of a row planter unit 25 of the planting implement 30, the following is a description of how the tensioning arrangement 20 operates in maintaining tension in and alignment of the endless linkage 115 relative to the drive train 70 of the row planter unit 25 of the implement 30.

Assume for example that the endless linkage 115 is wrapped around the sprockets 105 and 110 of the drive train 70 such that there is slack in the endless linkage 115. To apply tension in the endless linkage 115, an operator mounts the pre-assembled tensioning arrangement 20 on the frame 50 of the row planter unit 25 in connection with the endless linkage 115. One embodiment of the endless linkage 115 includes a detachable connector link 235 interconnecting free ends of the endless linkage 115. The connector link 235 is detached and the endless linkage 115 is passed between the spools 130 and 135 as illustrated in FIG. 5. Once the endless linkage 115 is received between the spools 130 and 135, the connector link 235 is reattached and the tensioning arrangement 20 is biased such that the linear end 185 of the spring 140 engages against the horizontal portion 190 of the frame 50 of the row planter unit 25 so as to cause the tensioning arrangement 20 to maintain tension in the endless linkage 115. The rib 155 in combination with the endwalls 160 and 165 at each of the spools 130 and 135 maintains alignment of the endless linkage 115 relative to the tensioning arrangement 20 and the drive train 20 during operation of the row planter unit 25.

Alternatively, the tensioning arrangement 20 is assembled with the endless linkage 115 at the row planter unit 25. One of the spools 130 and 135 is located on one side of the endless linkage 115 and the other of the spools 130 and 135 is located on the other side of the endless linkage 115, such that the endless linkage 115 travels between the first and second spools 130 and 135. The first tension arm 120 is placed on one side of the first and second spools 130 and 135, and the second tension arm 125 is placed at the opposite side of the first and second spools 130 and 135 such that that the spools 130 and 135 are located therebetween. A fastener 240 rotatably couples the spool 135 between the first and second tension arms. The first stepped portion 210 of the spindle 200 is inserted through the opening 205 extending through tension arms 120 and 125 and through the respective spool 130. The coiled body 180 of the spring 140 slips over and receives the second stepped portion 215 of the spindle 200 therethrough. The hooked end 175 of the spring 140 is aligned to engage against the tension arm 125. The fastener 225 inserts through the spindle 200 and rotatably connects the tensioning arrangement 20 at the vertical portion 230 of the frame 50 of the row planter unit 25. The linear end 185 of the spring 140 is aligned to engage against the horizontal portion 190 of the frame 50 of the row planter unit 25, biasing the spools 130 and 135 in engagement against the endless linkage 115 passing therebetween so as to maintain tension in the endless linkage 115. As described above, the rib 155 in combination with the endwalls 160 and 165 of each of the spools 130 and 135 maintains alignment of the endless linkage 115 relative to the tensioning arrangement 20 and the drive train 70.

As the spools 130 and 135 wear over time with use, the tensioning arrangement 20 can be detached, flipped in orientation, and reattached in a manner as described above such that lesser worn portions of the spools 130 and 135 engage against the endless linkage 115.

Even though the tension arrangement 20 is shown in combination with the exemplary endless chain linkage 115 of drive train 70 of row planter unit 25, the invention is not so limited. It should be understood to one skilled in the art that the drive train 70 may have various other known configurations (e.g., belt arrangement) for rotatably driving the metering mechanism 60 and is not limiting on the invention. Also, it should be understood that additional sprockets 105 and 110 (e.g., idling sprockets) can be employed in the drive train 70.

Many changes and modifications could be made to the invention without departing from the spirit thereof. The scope of these changes will become apparent from the appended claims.

We claim:

1. A tensioning arrangement used in combination with an endless linkage of a drive train mounted on a frame, comprising:

at least one tension arm;

at least one spool mounted at the at least one tension arm and biased in engagement against the endless linkage, wherein the at least one spool includes a rib generally centrally located between opposing first and second endwalls of the spool, the rib having a greater outer diameter relative to an outer diameter of an adjacent cylindrical portion abutting each side of the rib, and a spindle configured to insert through a first opening in the at least one tension arm in rotational support of the at least one spool, the spindle including a first stepped portion having a greater outer diameter relative to an outer diameter of a second stepped portion, wherein the first stepped portion receives the spring and wherein the second stepped portion receives the opening of the at least one tension arm and the opening in the at least one spool, wherein the spindle includes an opening through both the first and second stepped portions so as to receive a threaded fastener therethrough wherein both opposing first and second endwalls are of greater outer diameter relative to the rib and relative to the adjacent cylindrical portions between the rib and the first and second endwalls so as to steer the endless linkage between the first and second endwalls in general alignment with the rib;

wherein a spring biases the at least one spool in engagement against the endless linkage relative to the frame, the spring including a hook free end spaced apart from a linear-shaped free end, wherein the hook free end engages at the at least one tension arm, and wherein the linear shaped free end engages at the frame.

2. The arrangement as recited in claim 1, wherein the at least one spool includes a first spool and a second spool mounted at opposite ends of the least one tension arm, both the first and second spools configured to engage the endless linkage passing therebetween.

3. The arrangement as recited in claim 2, wherein the at least one tension arm includes a first tension arm spaced apart from a second tension arm so as to rotatably mount the first and second spools therebetween.

4. The arrangement as recited in claim 2, wherein at least one of the first and second spools is fixedly mounted so as to be stationary with respect to the at least one tension arm.

5. The arrangement as recited in claim 1, wherein the rib is of generally continuous outer diameter and uniform width along its entire circumference.

6. A row planting unit configured to distribute a particulate product across a field, comprising:

a drive train having an endless linkage configured to move a metering assembly operable to regulate the distribution of particulate product from the planting unit;

a wheeled frame in support of the drive train and the endless linkage; and a tensioning arrangement mounted at the endless linkage of the drive train, the arrangement including:

a spindle configured to insert through a first opening in the at least one tension arm in rotational support of the at least one spool, the spindle including a first stepped portion having a greater outer diameter relative to an outer diameter of a second stepped portion, wherein the first stepped portion receives the spring and wherein the second stepped portion receives the opening of the at least one tension arm and the opening in the at least one spool, wherein the spindle includes an opening through both the first and second stepped portions so as to receive a threaded fastener therethrough at least one spool mounted at an at least one tension arm, and a spring configured to bias the at least one spool against the endless linkage, wherein the at least one spool includes a rib generally centrally located between opposing first and second endwalls of the spool, the rib having a greater outer diameter relative to an outer diameter of an adjacent cylindrical portion abutting each side of the rib, wherein both opposing first and second endwalls are of greater outer diameter relative to the rib and relative to the adjacent cylindrical portion so as to steer the endless linkage between the first and second endwalls in general alignment with the rib.

7. The row planting unit as recited in claim 6, wherein the spring includes a hooked free end spaced apart from a linear-shaped free end, and wherein the hooked free end engages at the at least one tension arm, and wherein the linear shaped free end engages at the row unit frame in biasing the spool in engagement against the endless linkage.

8. The row planting unit as recited in claim 6, wherein the rib is of generally continuous outer diameter and uniform width along its entire circumference.

9. The row planting unit as recited in claim 6, wherein the at least one spool includes a first spool spaced apart from a second spool at opposite ends of the least one tension arm, both the first and second spools configured to engage the endless linkage passing therebetween.

10. The row planting unit as recited in claim 9, wherein the at least one tension arm includes a first tension arm spaced apart from a second tension arm so as to rotatably mount the first and second spools therebetween.

11. The row planting unit as recited in claim 6, wherein the at least one spool is fixedly connected at, so as to be stationary in relation to, the at least one tension arm.

12. An agricultural planting implement in tow to distribute particulate product across a field, comprising:

a toolbar coupled to at least one planter row unit operable to distribute the particulate product across the field, the at least planter row unit including:

a) a drive train having an endless linkage configured to move a metering assembly operable to regulate the distribution of particulate product from the planting unit;

b) a wheeled frame in support of the drive train and the endless linkage; and c) a tensioning arrangement mounted at the endless linkage of the drive train, the tensioning arrangement including at least one spool mounted at an at least one tension arm, wherein the at least one spool includes a rib generally centrally located between opposing first and second endwalls of the at least one spool, the rib having a greater outer diameter relative to an outer diameter of an adjacent cylindrical portion abutting each side of the rib, wherein both opposing first and second endwalls are of greater outer diameter relative to the rib and relative to the adjacent cylindrical portion so as to steer the endless linkage between the first and second endwalls in general alignment with the rib.

13. The agricultural planting implement as recited in claim 12, wherein the at least spool is fixed connected at, so as to be stationary in relation to, the at least one tension arm.

14. The agricultural planting implement as recited in claim 12, the tensioning arrangement further comprising a spindle configured to insert through a first opening in the at least one tension arm in rotational support of the at least one spool, the spindle including a first stepped portion having a greater outer diameter relative to an outer diameter of a second stepped portion, wherein the first stepped portion receives the spring and wherein the second stepped portion receives the opening of the at least one tension arm and the opening in the at least one spool, wherein the spindle includes an opening through both the first and second stepped portions so as to receive a threaded fastener therethrough.

15. The agricultural planting implement as recited in claim 12, wherein the rib is of generally continuous outer diameter and uniform width along its entire circumference.

16. The agricultural planting implement as recited in claim 12, wherein the at least one spool includes a first spool and a second spool rotatably mounted at opposite ends of the least one tension arm, both the first and second spools configured to engage the endless linkage passing therebetween.

17. The agricultural planting implement as recited in claim 16, wherein the at least one tension arm includes a first tension arm spaced apart from a second tension arm so as to rotatably mount the first and second spools therebetween.

* * * * *